United States Patent [19]

Lotznicker et al.

[11] Patent Number: 4,976,168

[45] Date of Patent: Dec. 11, 1990

[54] DRIVE FOR A DOOR OPERATOR

[76] Inventors: Lucio Lotznicker, 37 Balmoral Drive, Parkdale, Victoria, 3195; Raymond R. Hawkins, 25 Holbourne Drive, Cranbourne, Victoria, 3977; George Karban, 93 Haverbrack Drive, Mulgrave, Victoria, 3170; Simon Leivenzon, 16 Olinda Street; Zvi Leivenzon, 22 Trevescus Street, both of Caulfield South, Victoria, 3162, all of Australia

[21] Appl. No.: 378,193

[22] PCT Filed: Dec. 21, 1987

[86] PCT No.: PCT/AU87/00436

§ 371 Date: Jun. 22, 1989

§ 102(e) Date: Jun. 22, 1989

[87] PCT Pub. No.: WO88/04716

PCT Pub. Date: Jun. 30, 1988

[30] Foreign Application Priority Data

Dec. 22, 1986 [AU] Australia ............................ PH9615

[51] Int. Cl.5 ............................................ F16H 1/16

[52] U.S. Cl. ................................ 74/625; 192/114 R

[58] Field of Search ............... 74/625, 373; 192/93 A, 192/89 A

[56] References Cited

U.S. PATENT DOCUMENTS

| | | | |
|---|---|---|---|
| 2,454,880 | 11/1944 | Michelman | 74/407 |
| 2,819,628 | 1/1958 | Wardlaw | 74/625 |
| 3,134,273 | 5/1964 | Wardlaw | 74/625 |
| 3,930,422 | 1/1976 | Morimatsu | 74/625 |
| 4,034,624 | 7/1977 | Bianchini | 74/625 |
| 4,285,496 | 8/1981 | Coles | 74/625 X |
| 4,392,392 | 7/1983 | Perisic et al. | 74/626 |
| 4,452,292 | 6/1984 | Leivenzon et al. | 160/133 |
| 4,472,910 | 9/1984 | Iha | 49/139 |
| 4,519,487 | 5/1985 | Florin | 74/625 X |
| 4,562,908 | 1/1986 | Zouzoulas | 74/625 |
| 4,706,727 | 11/1987 | Leivenzon et al. | 160/188 |
| 4,741,226 | 5/1988 | Bernard et al. | 74/625 |

FOREIGN PATENT DOCUMENTS

| | | |
|---|---|---|
| 1700/36 | 4/1936 | Australia . |
| 1596/37 | 4/1937 | Australia . |
| 63834/80 | 11/1979 | Australia . |
| 27619/84 | 5/1983 | Australia . |
| 42295/85 | 5/1984 | Australia . |
| 601194 | 4/1948 | United Kingdom . |

*Primary Examiner*—Dirk Wright
*Attorney, Agent, or Firm*—Foley & Lardner, Schwartz, Jeffery, Schwaab, Mack, Blumenthal & Evans

[57] ABSTRACT

A drive suitable for a door or gate operator mechanism has a motor (1) and a gear box (5). The gear box (5) has a drive disengaging means (29) therein which can be pulled by a chord (7) to effect drive engagement of the motor (1) with the gear box (5). When the chord (7) is next pulled drive disengagement of the motor (1) with the gear box (5) is provided. The arrangement permits a door or gate which is driven by the operator to be manually opened in the event of power failure. The mechanical advantage of the gearbox (5) and the motor (1) on the door or gate is such that the gate cannot be manually opened without the drive being disengaged.

11 Claims, 11 Drawing Sheets

DRIVE FOR A DOOR OPERATOR

FIELD OF THE INVENTION

This invention relates to an improved drive for a door or gate operator and relates particularly, but not exclusively, to an improved door operator suitable for use in connection with roll-up or tilt-up type doors.

DESCRIPTION OF PRIOR ART

In the roll-up type door art, i.e. the art usually associated with garage type doors, it is a problem when an operator for the door is employed, that when the power is disconnected, the operator cannot be used. In these circumstances there has been provided a drive disengaging means so that the motor which is associated with the operator can be drive disconnected from the door. In these circumstances the door can then be opened manually. Reference is made to our Australian Patent No. 507,140 as one example of a prior art mechanism where the motor can be disengaged in these circumstances. One problem with many prior art types of motor releasing means is that the mechanism needed to permit releasing is quite complicated, expensive and bulky. This, in turn, inhibits the types of possible installations where an operator mechanism can be employed.

STATEMENT OF THE INVENTION

One aspect of the present invention attempts to overcome these problems.

Therefore, according to a first broad aspect of the present invention there may be provided an improved drive comprising a motor means and a drive gear box means, said drive gear box means having a drive disengaging means therein, said drive disengaging means being operable to permit drive engagement of said drive gear box means by being moveable in one direction and to permit drive disengagement of said drive gear box means when next moved in the same direction.

Most preferably the drive disengaging means is operable by an angularly rotatable indexing means, said movement in one direction being an angular movement thereof.

The angularly rotatable mechanism can be connected with chord means which terminates with a removable key barrel at a convenient user location adjacent a door to which the operator is to be attached. Thus, if the power should fail, a person can operate the lock barrel to withdraw it from its seat and by pulling displacement of the chord, can effect angular rotation of the indexing means to effect drive disengagement. Subsequent pulling can then restore drive connection.

BRIEF DESCRIPTION OF DRAWINGS

Detail of the present invention will be apparent from the following description of a preferred embodiment wherein.

DESCRIPTION OF PREFERRED EMBODIMENT

Figure 1:
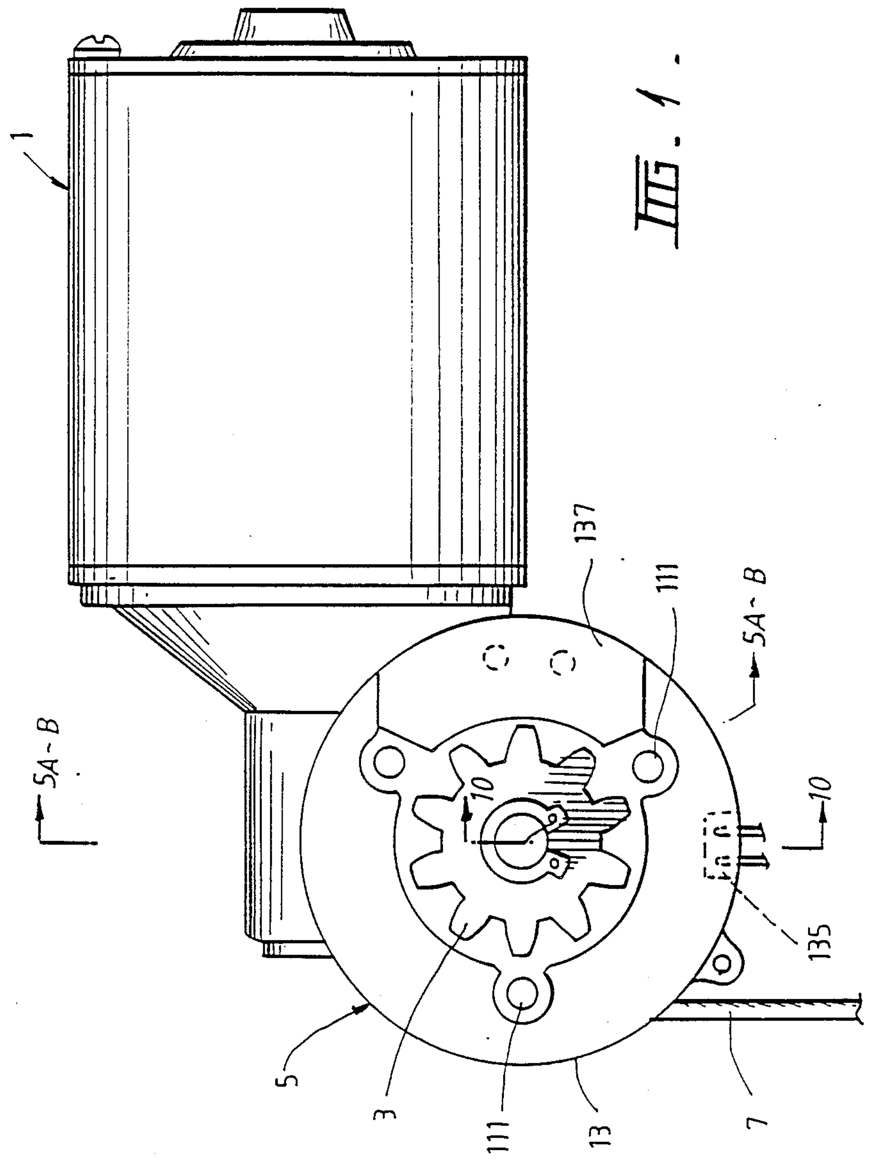
FIG. 1 is a side view of an electric motor and a gear box for a roll-up door operator mechanism.

Referring now to FIG. 1 there is shown a drive motor 1 such as an electric motor. Typically the drive motor 1 is a DC motor where the direction of rotation can be reversed by changing the polarity of the voltage supplied thereto. The output from the motor 1 is transferred to a drive sprocket 3 through a gear box 5 which houses a drive disengaging means (to be referred to later) which has an angularly rotatable indexing means (to be referred to later) which will effect drive disengagement and drive engagement of gears within the gear box 5. The indexing means can be operated by a chord 7. The chord 7 is attached to a key barrel (not shown) which, in turn, is positioned at a convenient user location adjacent the door to which the operator mechanism is to control. In the event of power failure, the barrel can be released from its socket or scat and pulled by a user thereby pulling the chord 7 to effect drive disengagement of the motor. In this drive disengaged condition, the mechanical advantage forces through the gearing of the motor 1 which would otherwise inhibit manual opening of the door are removed and the door can be manually opened.

Figure 8:
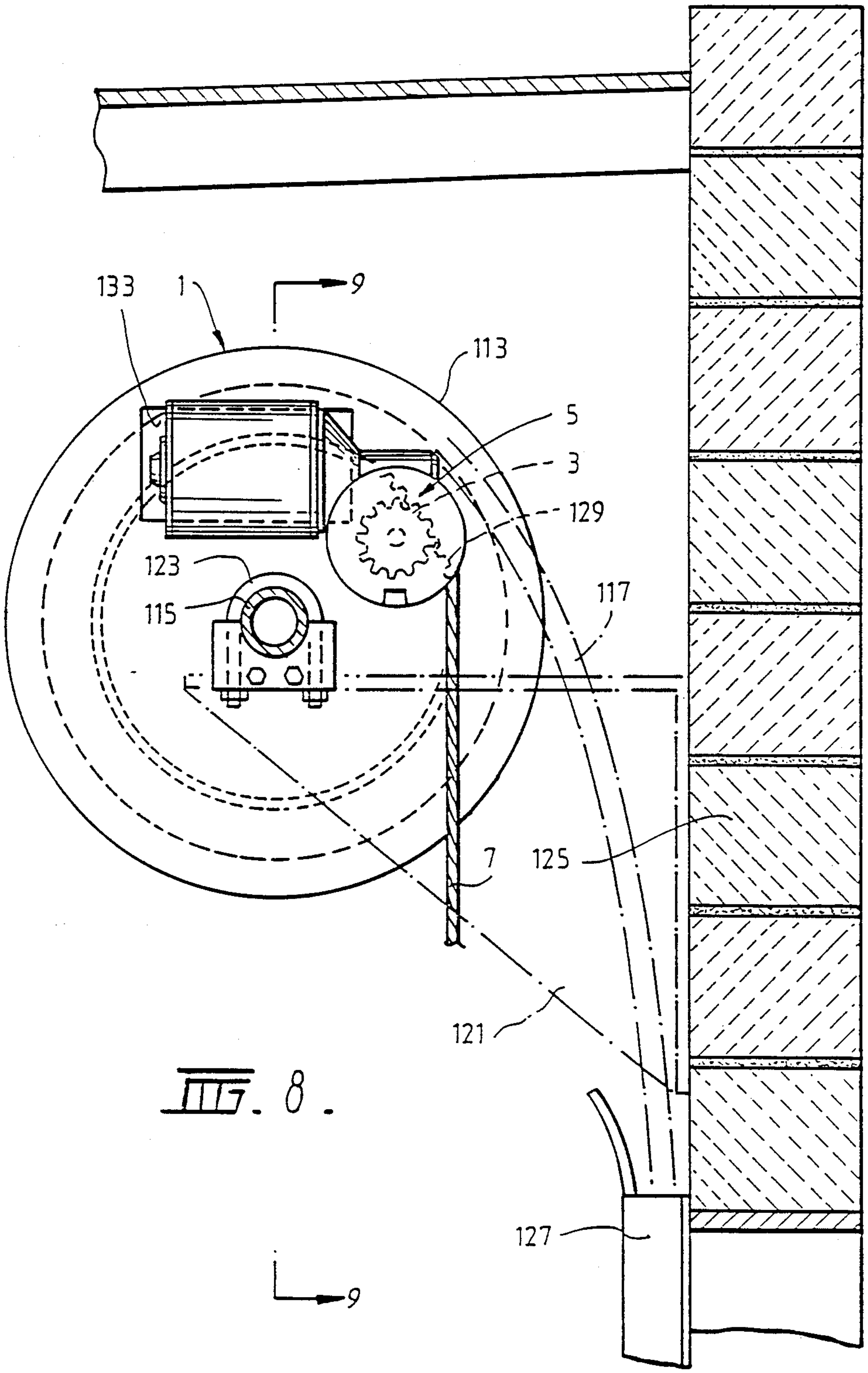
FIG. 8 is a side view of the motor and gear box operatively interconnected with a roll-up door.
Figure 9:
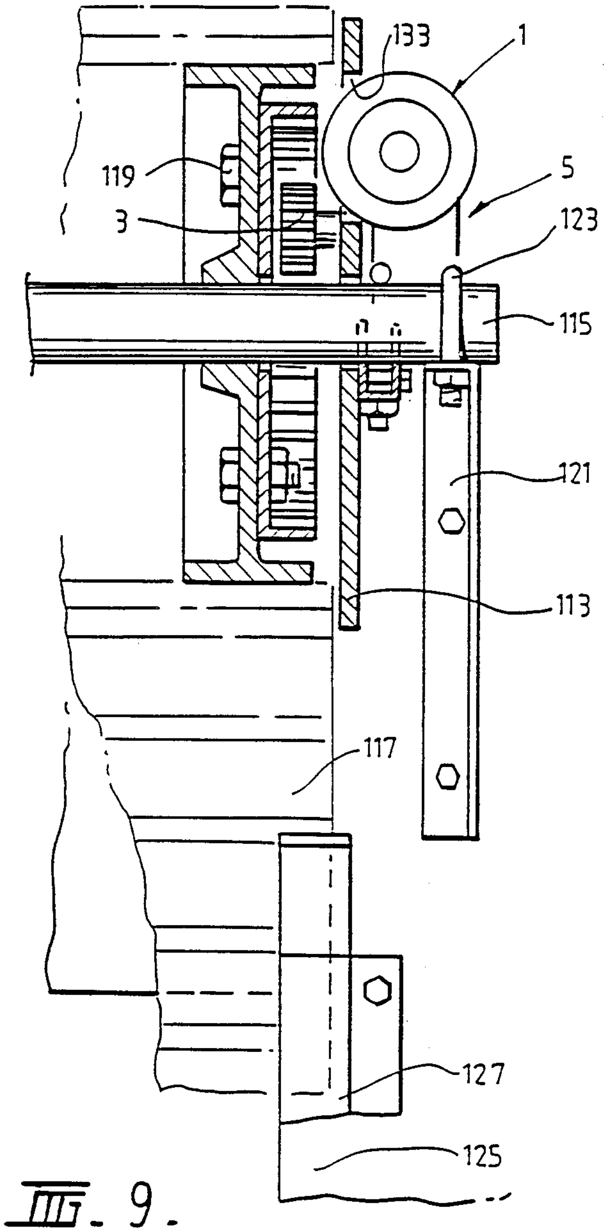
FIG. 9 is a sectional elevation along line 9-9 of FIG. 8.

The drive sprocket 3 is conveniently attached with a ring gear in part of an operator mechanism which rotates a drum onto which a door curtain is wound. A typical example of such a mechanism is disclosed in our aforementioned Australian Patent No. 507,140. One preferred example is shown in FIGS. 8 and 9.

When drive engagement is again required, then the indexing means can be rotated by pulling the chord 7 and the gears will be caused to mesh.

Figure 2:
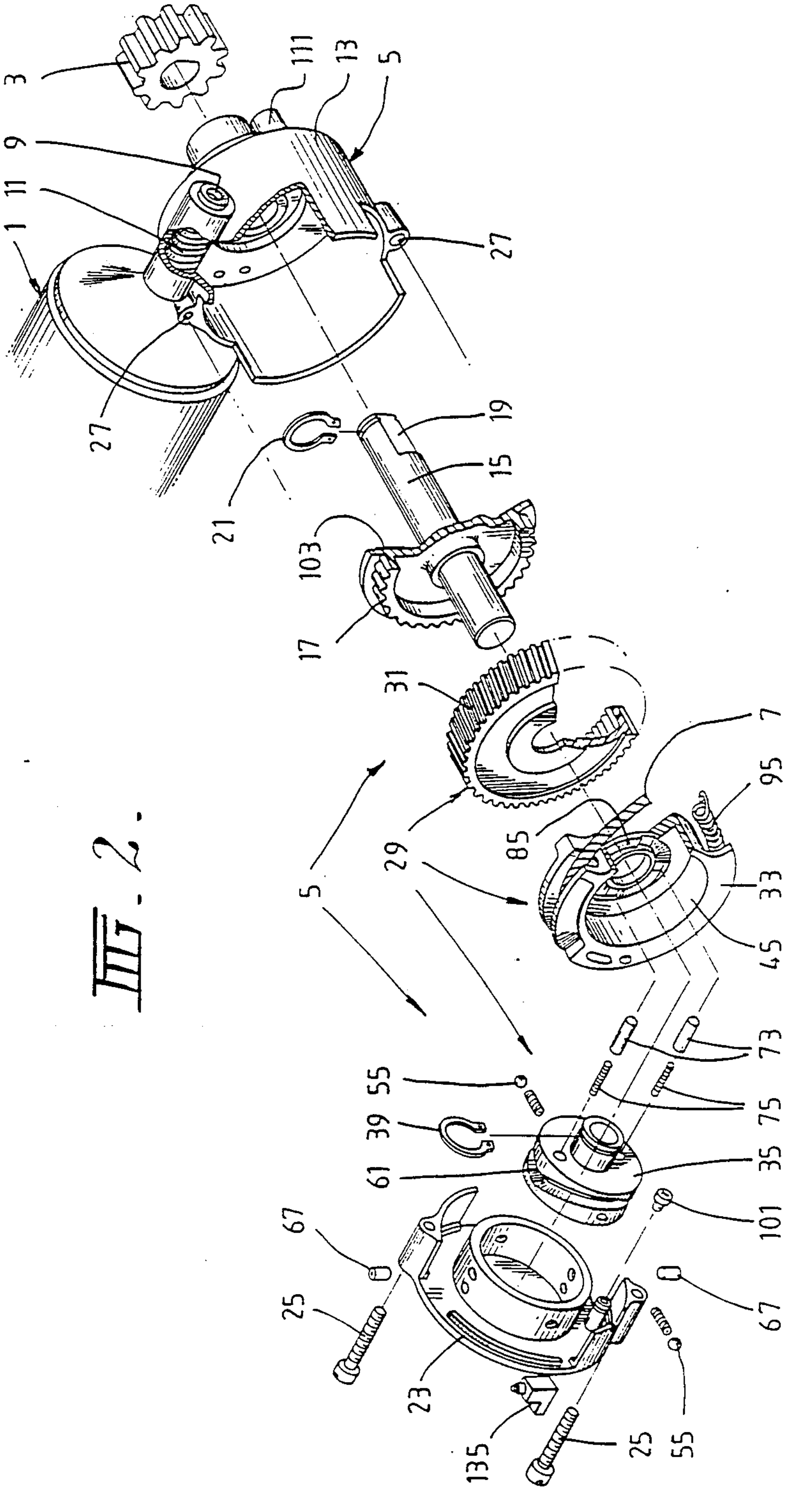
FIG. 2 is an exploded perspective view of the motor and gear box shown in FIG. 1.

Referring now to FIG. 2 there is shown an exploded view of the motor 1 and gear box 5. The shaft 9 of the motor 1 is fitted with a worm drive 11. The worm drive 11 is received within a gear box housing 13. The gear box housing 13 supports an output shaft 15 which carries an output gear 17 fixedly thereon. The drive sprocket 3 fits over the output shaft 15 and locates on a flat 19 thereon so that drive can be established. A circlip 21 holds the drive sprocket 3 to the output shaft 15.

The gear box housing 13 also contains other gears and components (which will be referred to later) and is closed at its end remote from drive sprocket 3 by a cover plate 23. The cover plate 23 is screwed to the gear box housing 13 by means of two screws 25 which locate in threaded apertures 27 on the gear box housing 13.

A drive disengaging means shown generally by numerals 29 is mounted within the gear box housing 13 and enables a gear 31 to be displaced axially along output shaft 15 relative to output gear 17. THus, when gear 31 is displaced relative to output gear 17, drive from the motor 1 is not transmitted to the output shaft 15 and visa versa.

Gear 31 is caused to displace axially along the output shaft 15 by means of an angularly rotatable indexing means 33. The indexing means 33 has the chord 7 partly wrapped therearound. Applying a tension or pulling force to the chord 7 will displace the indexing means 33 one quarter of a turn angularly. This, in turn, will cause an associated tracking mechanism 35 to effect axial displacement of the indexing means 33 and thus axial displacement of gear 31 relative to output gear 17.

Figure 3:
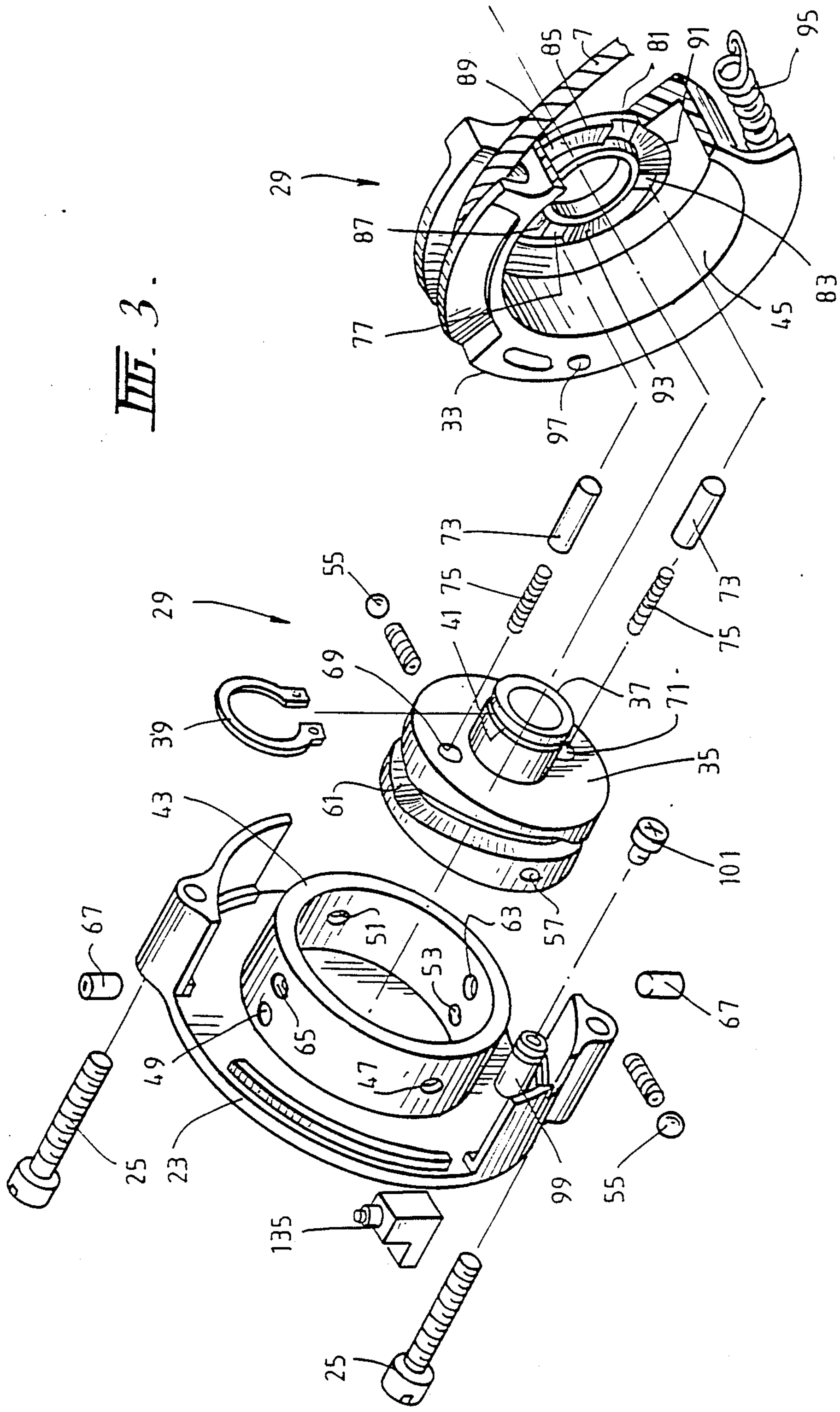
FIG. 3 is a close-up exploded view of the left hand side of FIG. 2.

Referring now to FIG. 3 there is shown an enlarged view of the left hand side of FIG. 2. It should be appreciated that the tracking mechanism 35 has the indexing means 33 fitted over its boss 37. The gear 31 is also fitted over the boss 37 and a cir-clip 39 is fitted in groove 41 to hold the tracking mechanism 35, indexing means 33, and gear 31 in axially assembled relationship.

It can be seen that the cover plate 23 has an annular web 43 and that the tracking mechanism 35 locates within the cavity defined by the annular web 43 and that the annular web 43 locates within an opening 45 in the angularly rotatable indexing means 33. The annular web 43 has four indexing apertures 47, 49, 51 and 53. These apertures are displaced equally at 90° angularly to each other. Apertures 49 and 53 are axially in line along the longitudinal axis of output shaft 15 and apertures 47 and 51 are axially in line along the longitudinal axis of output shaft 15. The axial displacement between apertures 49 and 53 and apertures 47 and 51 is equal to the required axial displacement through which gear 31 moves relative to output gear 17 to effect drive disengagement.

The tracking mechanism 35 has two diametrically opposed indexing balls 55 which are received with apertures 57 and which are urged outwardly by spring means 59. In use, the indexing balls 55 locate in respective ones of the indexing apertures 47, 49, 51 or 53 as the indexing means 33 is angularly rotated by pulling on the chord 7.

It can be seen that the tracking mechanism 35 has a groove 61 on the outer circumferential surface. The groove 61 follows a generally tortuous path which in the axial direction along the longitudinal axis of output shaft 15 represents the distance of displacement of gear 31 relative to output gear 17. Accordingly, for each 90° angular displacement around the circumferential surface of the tracking mechanism 35, the groove 61 follows a path which moves first from one side of the tracking mechanism 35 to the opposite side. It then travels from that opposite side back to the one side.

The annular web 43 has two diametrically opposed apertures 63 and 65. Tracking pins 67 locate within the apertures 63 and 65 and locate within the groove 61 on the tracking mechanism 35. The tracking mechanism 35 has two apertures 69 and 71 in the end face thereof which is directed towards the indexing means 33. Drive pins 73 locate in the apertures 69 and 71 and are urged outwardly towards the indexing means 33 by spring means 75.

The indexing means 33 carries four indexing drive slots 77, 79, 81 and 83. Indexing drive slot 79 cannot be seen in FIG. 3. The indexing drive slots 77, 79, 81 and 83 are spaced angularly 90° apart. The drive pins 73 are provided to locate in diametrically opposed ones of the indexing drive slots 77 and 81, or 79 and 83. The annular surface 85 which extends circumferentially around indexing drive slots 77, 79, 81 and 83 is provided with four cam surfaces 87, 89, 91 and 93. The cam surfaces are identical and are arranged such that they extend from, for example, the top of slot 77 downwardly to the base or inner most depth of slot 83.

A spring means 95 is attached to the outer surface of the indexing means 33 and is held thereto by a pin 97. A spring 95 is also held to a pin 99 which forms part of the cover plate 23. A screw 101 secures the spring 95 to the pin 99. Accordingly, when chord 7 is pulled the indexing means 33 is driven in a clockwise direction when viewing the indexing means 33 shown in FIG. 3 thus extending spring means 95. The indexing means 33 will then provide drive from the indexing drive slots 77, 79, 81 and 83 through the drive pin 73 to angularly displace the tracking mechanism 35. The tracking mechanism 35 will index angularly 90° as provided by the indexing balls 55, and the indexing apertures 47, 49, 51 and 53. During this angular motion the tracking mechanism 35 will displace axially along output shaft 15 because of the tracking pin 57 tracking the groove 61 and causing the necessary displacement. When tension is removed from the chord 7 the indexing means 33 will then move anticlockwise by virtue of the applied tension on the spring means 95 caused by the initial pulling of the chord 7. The drive pin 73 will thus track along the cam surfaces 87, 89, 91 and 93 to locate in different ones of indexing drive slots 77, 79, 81 and 83 to those in which they were previously located.

Because the tracking mechanism 35 has displaced axially along the output shaft 15 then the gear 31 will also axially displace and either drive engage or drive disengage with the output gear 17. When the chord 7 is next pulled there will be corresponding angular displacement of the indexing means 33 and the tracking mechanism 35 but the groove 61 on the tracking mechanism 35 will cause displacement in the opposite direction to that last moved. Thus there will be drive engagement or drive disengagement of gear 31 with output gear 17.

Figure 4:
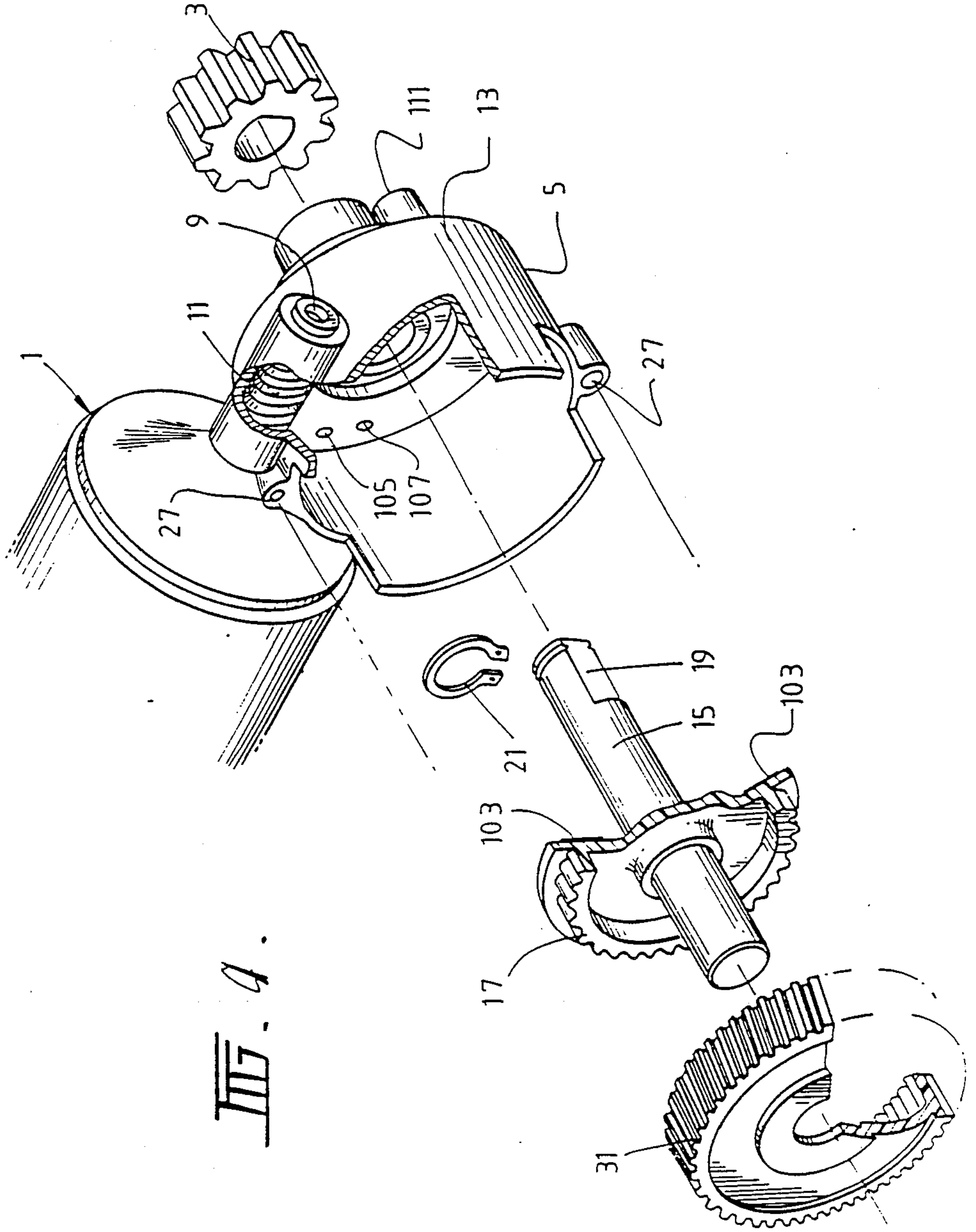
FIG. 4 is a close-up view of the right hand side of FIG. 2.

By observing FIG. 4 it can be seen that the right hand side of FIG. 2 has been shown. The gear 31 can be clearly seen as a ring gear with both externally and internally configured teeth. The externally configured teeth are arranged to mesh with the worm drive 11 on the shaft 9 of the motor 1. The internally configured teeth of gear 31 are arranged to mesh with the teeth on output gear 17.

Thus, it can be seen that the drive disengaging means 29 permits either drive engagement or drive disengagement in gear box 5 when it is moved in one direction. When it is again moved in the same direction then drive disengagement or drive engagement, i.e. the opposite engagement to that previously provided. It can also be seen that the one direction corresponds to the direction of pulling on chord 7 which, in turn, causes the angularly rotatable indexing means 33 to rotate in that direction and effect operation of the drive disengaging means 29.

Figure 5A:
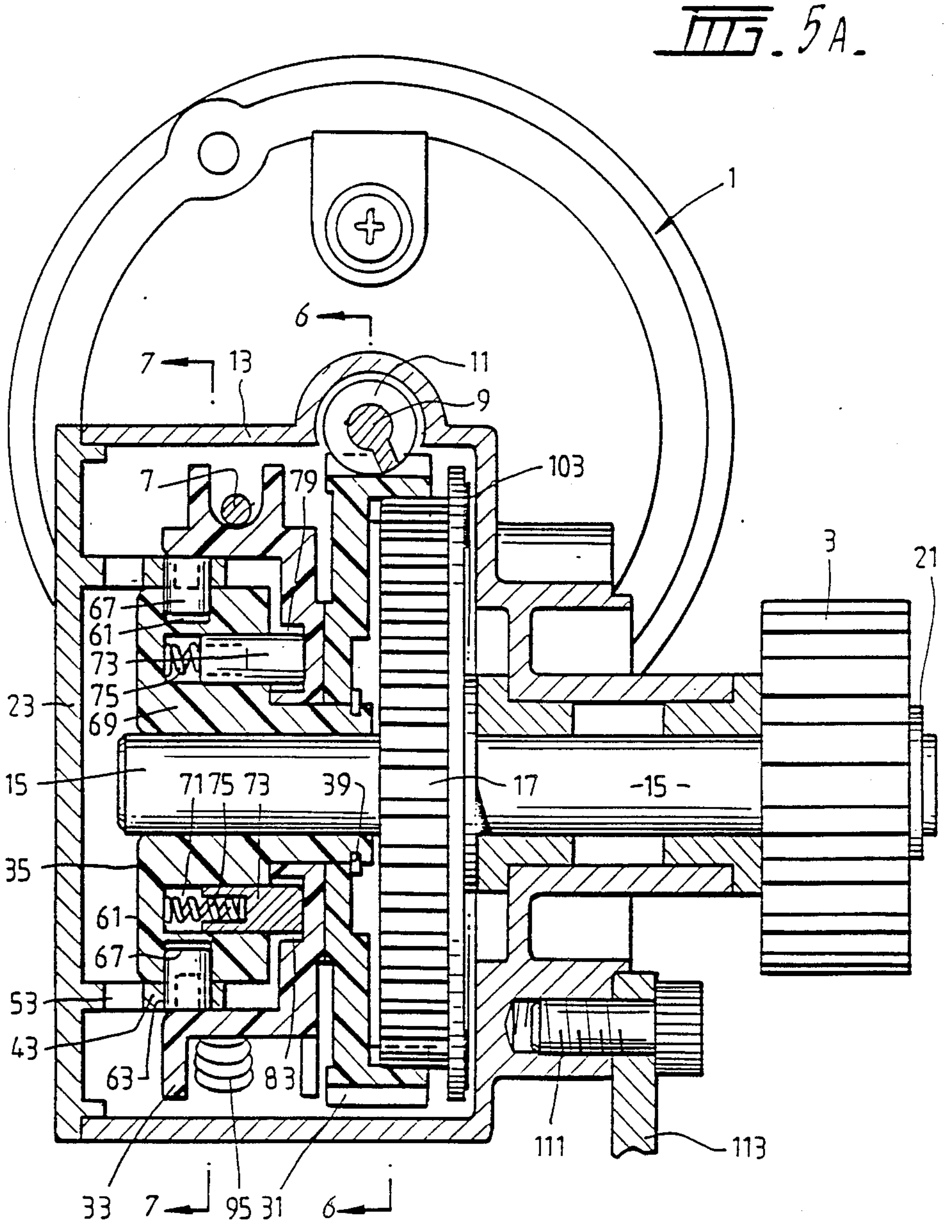
FIG. 5*a* is a sectional view through line 5—5 of FIG. 1 showing the motor and gear box in a drive engaged position.
Figure 5B:
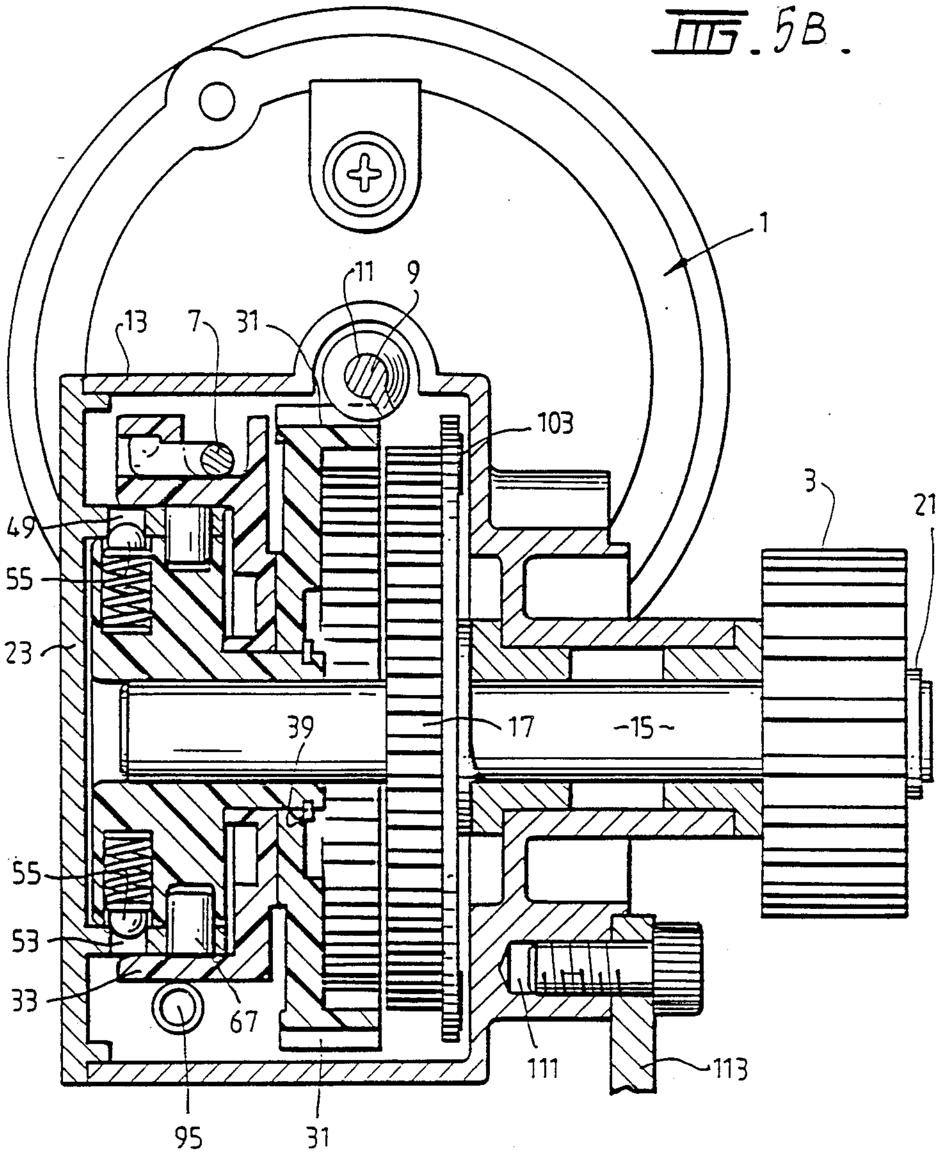
FIG. 5*b* is a view similar to FIG. 5*a* but showing the motor and gear box in a drive disengage position.
Figure 6:
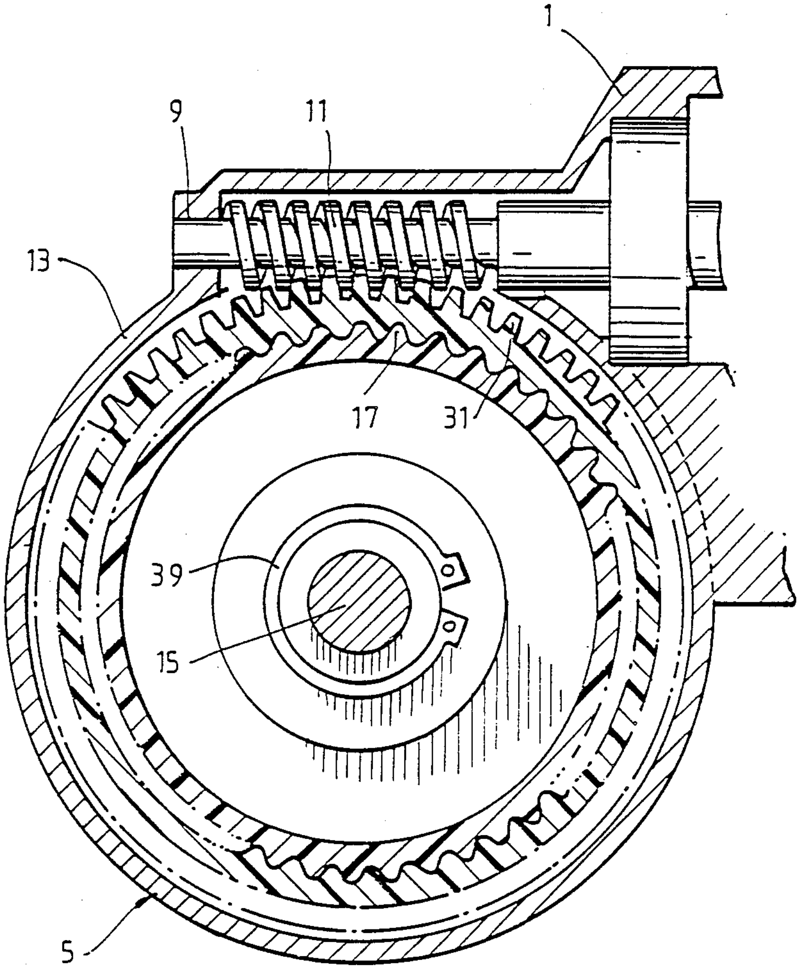
FIG. 6 is a sectional view along line 6—6 of FIG. 5*a;*
Figure 7:
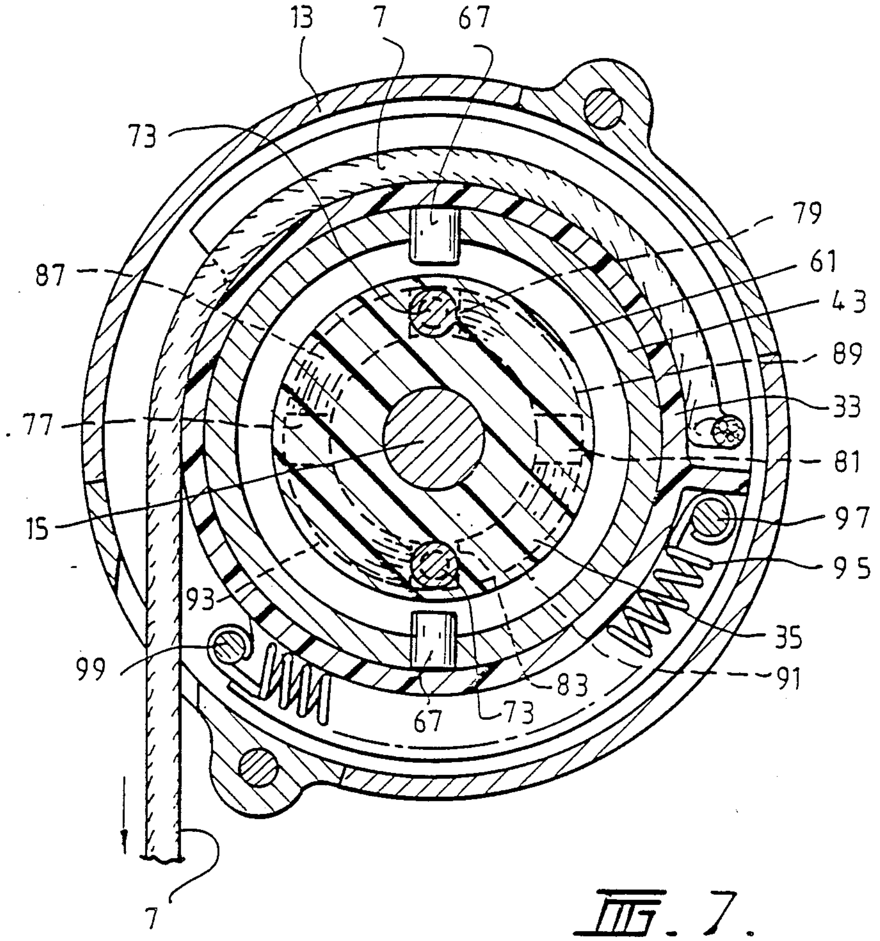
FIG. 7 is a sectional view along line 7—7 of FIG. 5*a;*

FIGS. 5 through 7 show views of the drive motor 1 and gear box 5 where like components shown in FIGS. 1 through 4 have the same number references. The gear box and drive disengaging means is quite small compared to that in the prior art and thus an operator incorporating such can be installed in places where a more bulky prior art operator cannot.

The end face of gear 17 which is closest to the drive sprocket 3 may conveniently contain encoding marks in annular ring 101.

It can be observed that the gear box 5 has two openings 105 and 107. These openings are provided so that respective optical sensing means (not shown) may be received therein. The optical sensing means is mounted within cover 137. The optical sensing means can be arranged to detect the coding on the encoded ring 101. In this connection, it is noted that openings 105 and 107 are at the same radial distance from the centre of the shaft 15. Thus they both align with the encoded ring 101. The displacement apart of the openings 105 and 107 is arranged to be slightly different and not a multiple of the spacing of the bar coding in the ring 101. Thus, for clockwise direction of rotation, either the optical sensor in opening 105 will first receive a signal pulse representing a code prior to the optical sensor in opening 107 receiving a code, or vice versa. Thus, by analysing output signals from the optical sensor it is possible to determine (a) speed of movement of the output gear 17 and also the direction of movement of the output gear 17.

By providing the optical sensors in openings 105 and 107 it is possible to determine the speed of rotation of the output gear 17 and thus the speed of movement of the door. By detecting any change in speed of the door it is possible to sense that there may be an obstruction inhibiting closing of the door and thus the door can be automatically moved to the fully opened position. The necessary control circuitry for the above is considered within the scope of an electronics addressee in this art.

Figure 10:
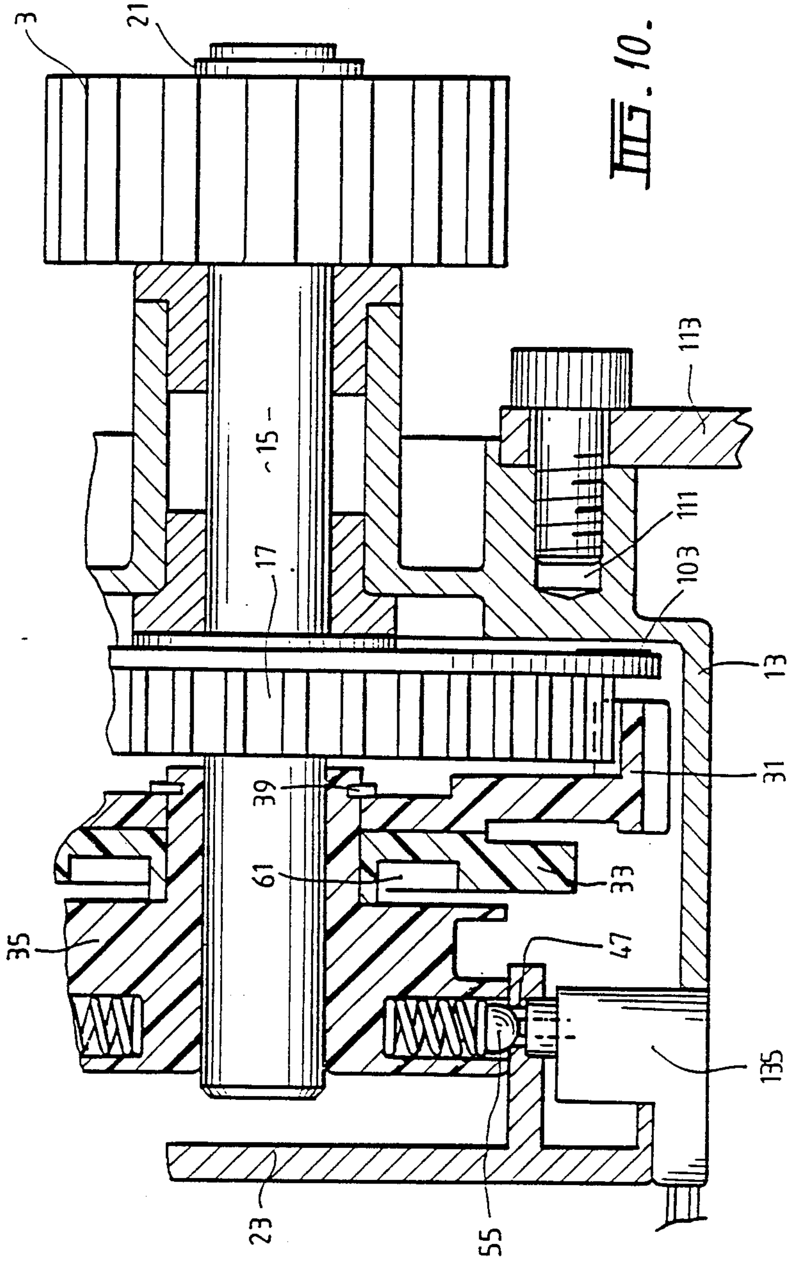
FIG. 10 is a view similar to FIG. 5(*a*) but taken along line 10—10 of FIG. 1.

By observing FIG. 10 it can be seen that a microswitch 135 is provided fixed to the cover plate 23. The microswitch 135 is positioned immediately adjacent indexing aperture 47 so that when indexing ball 55 locates in the aperture 47, it will engage with the microswitch, as shown, to cause it to operate. This occurs in the drive engaged indexed position. Thus, a signal can be given from microswitch 135 to represent that there is drive engagement and drive disengagement.

FIGS. 8 and 9 show how the motor and gear box 5 are mounted to be an operator mechanism for a roll-up type garage door. The gear box 5 has three mounting openings 111 (see FIG. 1) which are used to fasten the gear box onto a circular end plate 113 of a door operator. The circular plate 113 is fitted over an axle 115 which carries a door curtain 117. The door curtain 117 is wound around a pair of end drums 119 at each side of the curtain 117. The axle 115 is mounted so it cannot rotate by being mounted directly onto a right angle bracket 121 by means of a U-bolt 123. A right angle bracket 121 is, in turn, bolted to a brick or other front face 125 of a garage, for example. The curtain 117 is typically corrugated across its length, i.e. horizontally corrugated, and edges of the curtain locate in curtain guide tracks 127 which are fastened to the inner brick face 125 around the side edges of the opening which the curtain 117 is to close. The end drums 119 are able to freely rotate over the fixed axle 115. In order to permit drive of the end drums 119 there is provided an internally toothed crown gear 139 which is bolted to the end drum 119 at the side of the door to which the operator is to be attached. The drive sprocket 3 of the gear box 5 engages with the internally toothed crown gear 129. The end plate 113 is clamped to the axle 115 by means of a U-bolt and saddle 131. The saddle of the U-bolt and saddle 131 is bolted to the end plate 113. A rectangular shaped cut-out 133 is provided in the end plate 113 so that a portion of the motor 1 will pass into the rectangular shaped cut-out 133 and provide for relatively compact assembly of all of the components at the side of the door curtain 117. In other words, the motor 1 does not extend past the outermost diameter provided by the layers of the curtain 117 on the end drums 110. The motor 1 and gear box 5 are on one side face of end plate 113 and the sprocket 3 is then on the other side face of end plate 113. Moreover, the motor 1 does not protrude unduly from the end plate 113 along the axial length of the axle 115. In use the chord 7 is brought down to a key barrel (not shown) which is conveniently mounted to protrude from the front of the brick face 125. Thus when it is required to drive disengage the motor from the curtain 117, as in the event of a power failure, and the mechanical advantage forces being too great to allow manual opening of the door curtain 117, the key barrel can be operated so that the barrel is released and a user can pull the chord 7. The curtain 117 can then be opened.

Any suitable electronic control circuitry for the motor is provided. The details of this are considered to be well known in this art and accordingly have not been shown.

Many modifications may be made to the present invention as would be apparent to persons skilled in the door manufacturing arts, gear box arts and/or electronic arts associated with door operator mechanisms.

These and other modifications may be made without departing from the ambit of the invention the nature of which is to be determined from the foregoing description.

We claim:

1. An improved drive comprising a motor means and a gear box means having an indexing drive disengaging means therein, said indexing drive disengaging means being operable to permit drive engagement of said drive gear box means with said motor means when indexed by movement in one direction and to permit drive disengagement of said drive gear box means with said motor means when next indexed by movement in the same direction, wherein rotating meshing drive members in said gear box means are relatively displaceable to each other along a central rotational axis of at least one of the rotating meshing drive members, in order to cause drive disengagement.

2. A drive as claimed in claim 1, wherein said drive disengaging means being operable by an angularly rotatable indexing means, the movement in said one direction being an indexing angular movement thereof.

3. A drive as claimed in claim 2, wherein said gear box has an output shaft and wherein said angularly rotatable indexing means is mounted on said output shaft so that it can rotate independently of said output shaft, a gear mounted on said output shaft so that it can rotate independently of said output shaft, an output gear fixedly mounted to said output shaft so that it will drive said output shaft when it is driven by said gear, and wherein there is a tracking mechanism mounted on said output shaft so that it can rotate independently of said output shaft, said angularly rotatable indexing means, said gear and said tracking mechanism constituting said indexing drive disengaging means and being held together against longitudinal displacement relative to each other along said output shaft but moveable together along said output shaft, said tracking mechanism having a circumferential groove which follows a tortuous path which has a longitudinal displacement along the output shaft equal to the required movement to effect drive disengagement of said gear with said output gear, tracking pin means in said circumferential fixed longitudinal of said output shaft.

said gear being caused to be displaced longitudinally of said output shaft to effect drive disengagement with said output gear when said angularly rotatable indexing means is moved in said one direction.

4. A drive as claimed in claim 3, wherein said angularly rotatable indexing means is rotatable substantially 90° each time said angularly rotatable indexing means is moved in said one direction to effect said drive engagement or disengagement.

5. A drive as claimed in claim 4, wherein said angularly rotatable indexing means is biased by spring means to return to an initial position following movement in said one direction, said angularly rotatable indexing means having four radial slots on the face thereof which faces said tracking means, said four radial slots being displaced angularly at substantially 90° to each other, there being ramp surfaces on said face between each of said slots, said tracking mechanism having drive pin means extending therefrom for engaging with the surfaces of said slots and said ramp surfaces, the arrangement being such that when said angularly rotatable indexing means is moved in said one direction, it will drive said tracking mechanism by said drive pin means locating in said slots and being angularly rotated thereby, and following movement forces causing said angularly rotatable indexing means being removed said spring means will biasingly return said angularly rotatable indexing means to said initial position by said drive pin means then passing along said ramp surfaces and locating in the next angularly displaced slots.

6. A drive as claimed in claim 4, wherein said tracking mechanism carries indexing means to index said tracking mechanism at substantially 90° each time said angularly rotatable indexing means is moved in said one direction to effect drive engagement or disengagement.

7. A drive as claimed in claim 6, including switch means co-operating with said indexing means to provide an electrical switch contact when either said drive engagement or disengagement is provided.

8. A drive as claimed in claim 6, including encoding marks on said output gear and optical reading means for reading said encoding marks as said output gear is driven.

9. A drive as claimed in claim 6, wherein said output shaft extends perpendicular to a motor shaft of said motor and wherein there is a worm gear on said motor shaft for transmitting drive from said motor to said gear.

10. A drive as claimed in claim 9, mounted to one face of an end plate so that said output shaft protrudes therethrough to the opposite face, said end plate being mounted to an axle of a roll-up door at one side of a curtain thereof so that a sprocket gear on said output shaft drive engages with an internally toothed ring gear which drives a drum onto which a curtain of said roll-up door is wound and unwound.

11. A drive as claimed in claim 10 wherein said angularly rotatable indexing means carries a cord over its outer circumferential surface, and pulling of said cord moves said angularly rotatable indexing means in said one direction.

* * * * *